April 6, 1965  K. JANISZEWSKI  3,176,378
METHOD OF MAKING A BUSHING SOCKET IN A PLATEN
Filed April 9, 1962
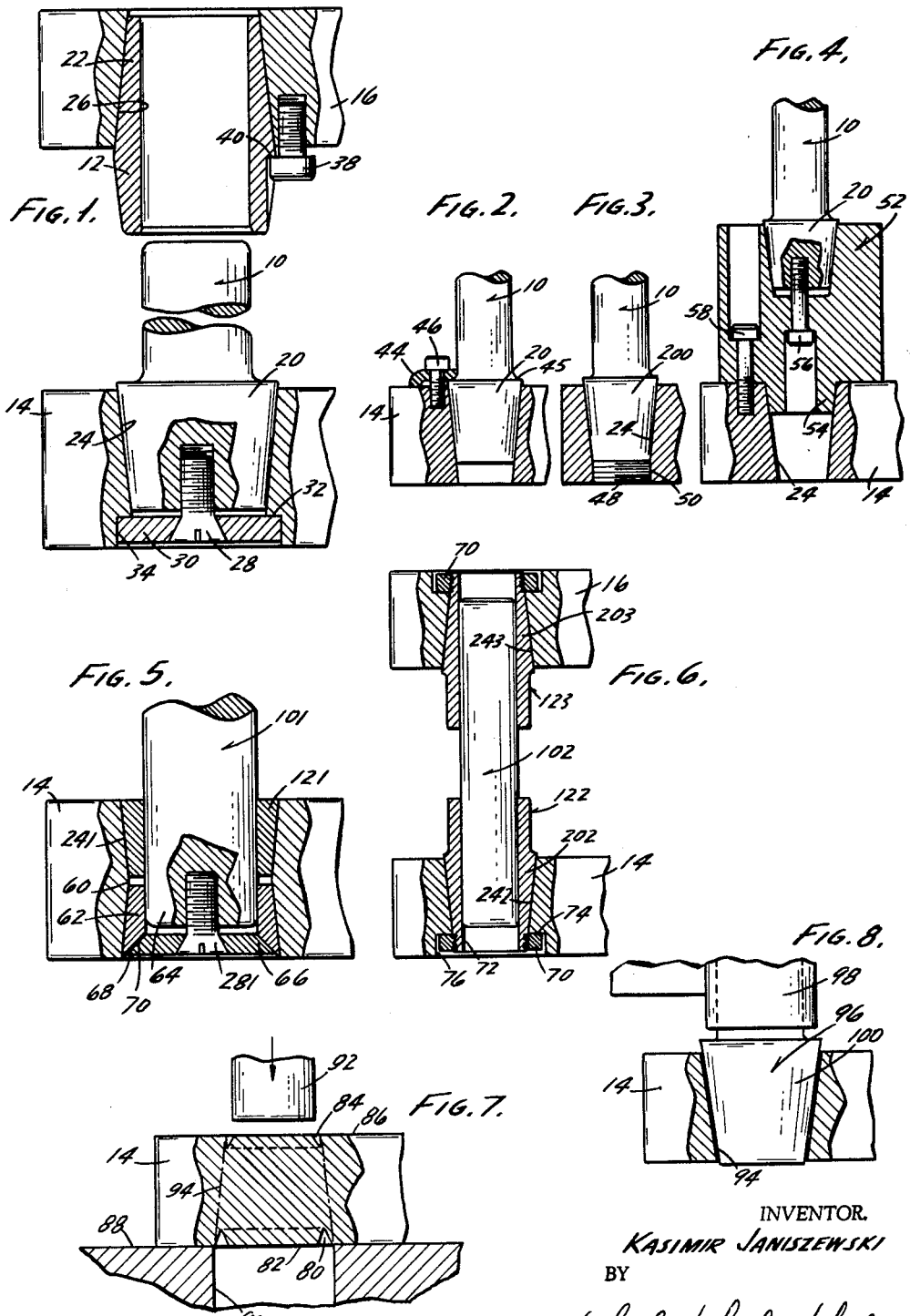
INVENTOR.
KASIMIR JANISZEWSKI
BY
Wheeler, Wheeler & Wheeler
ATTORNEYS.

3,176,378
METHOD OF MAKING A BUSHING SOCKET
IN A PLATEN
Kasimir Janiszewski, 5426 Andover Road,
Milwaukee, Wis.
Filed Apr. 9, 1962, Ser. No. 186,102
3 Claims. (Cl. 29—149.5)

This invention relates to a method of making sockets in a platen for mounting of die set leader pins and bushings.

The leader pin of a die set, and the bushing or bushings with which it cooperates must be exactly normal to the platen. This involves a number of related problems, some of which concern setting them correctly in the first place and some of which concern maintaining a precision setting.

According to the present invention, the platen in which the leader pin or its extension is to be mounted is provided with a conically tapered socket made by first forming an unfinished conical hole approximating the desired dimensions and then using a tapered cutting tool to finish the socket with precision.

The cutting tool preferably comprises a drill or reamer of conical form used to finish the conical socket on an axis normal to the platen. The cutting tool has bearing support in immediate proximity to the surface of the platen to assure accuracy. It is inserted in the preformed hole substantially to the full depth of the tool before the cutting operation commences. Because the tool is symmetrical and because its required range of movement is very much less than the thickness of the platen and it therefore has little projection from its supporting bearings, there is great accuracy and virtually no deflection in finishing the socket.

In addition to savings of one-third or more than one-third of the cost of manufacture, the method and construction herein disclosed effect important savings in shipment and in use, the useful life of the die set being very much prolonged as will hereinafter be explained.

In the drawings:

FIG. 1 is a fragmentary detail view of one corner portion of a die set portion of the platen and the leader pin being shown in elevation and portions being broken away to an axial section.

FIG. 2 is a view on a smaller scale similar to a portion of FIG. 1 and showing a different retaining means.

FIG. 3 is a view similar to FIG. 2 showing another form of retaining means.

FIG. 4 is a further modified embodiment of the invention showing another form of retaining means.

FIG. 5 is a fragmentary detail view similar to a portion of FIG. 1 showing a modified embodiment of the invention.

FIG. 6 is a fragmentary detail view similar to FIG. 1 but on a reduced scale showing another modified embodiment of the invention.

FIG. 7 is a fragmentary detail view diagrammatically illustrating a step of the method herein disclosed.

FIG. 8 is a fragmentary detail view diagrammatically illustrating another step in the method herein disclosed.

As already indicated, both the leader pin 10 and the bushing 12 with which it coacts are die set parts requiring absolute accuracy of coaxial mounting in a position normal to the lower platen or die carrier 14 and the upper platen or punch carrier 16. Ordinarily the leader pin and its bushing are hardened, being much harder than the platens. According to the present invention, both the extension base 20 of leader pin 10 and corresponding portion 22 of the bushing 12 are frusto-conically tapered and seated in complementary tapered sockets 24 and 26 in the die carrier 14 and the punch carrier 16 respectively.

The angle of taper should be sufficiently great so that the parts mounted therein will not seize the platen but it should not be so great as to preclude rigidity of mounting when the tapered part is anchored in its complementarily tapered socket by appropriate retaining means. The angle at which the parts will seize to the platen varies slightly according to materials used but in a die set the angles will normally be within a range of three and one-half to ten degrees from normal.

By way of retaining means, FIG. 1 suggests anchorage of the base portion 20 of leader pin 10 by means of screw 28 threaded into the base portion 20 of the leader pin and having its end engaged with an anchorage disk 30 seated on the shoulder 32 provided by counterbore 34 in the under surface of platen 14. A user receiving a die set in disassembled condition can erect the leader pin in the die carrier platen 14 with ease, requiring no tool other than a screwdriver. Yet he is assured that if the conically tapered base 20 and socket 24 were correctly made in the first place, the erected leader pin 10 will be absolutely normal to the platen 14 and will retain its normal position against stress which would destroy the conventional die set. Apparently, the leader pin, when subjected to lateral pressure at its upper or free end, may be deflected temporarily to a slight degree by reason of the taper. In response to the stress, one side of the base will lift slightly from the socket, this movement being accommodated within the elastic limit of the retaining means which here comprises screw 28 and disk 30. When the stress is relieved, the retaining means reacts resiliently to draw the base back into its original position in the socket, thus restoring the leader pin precisely to its original normal position.

In the case of the bushing part 12, the retaining means comprises a number of screws 38, one of which is illustrated in FIG. 1, the screws being engaged at angular intervals with shoulders 40 with which the bushing is provided. Obviously, like retaining means may be used to anchor the base portion 20 of leader pin part 10 if desired. The tapered bushing portion 22 and the tapered socket 26 provided in the punch carrier platen 16 are within the range of angles above specified and the operation is the same. While it is less important in the case of the bushing to provide for this potential deflection (because the bushing has less projection from its platen) nevertheless there are situations in which the bushing is really an extension of a leader pin mounted therein and it is therefore desirable that the bushing have the same type of mounting in its platen as is provided when the leader pin is mounted directly.

In FIG. 2, the anchorage of the base portion 20 of leader pin 10 in platen 14 comprises an angled clip 44 engaged over the shoulder 45 of the leader pin base and held by a screw 46 threaded into the platen. The principle of operation is the same.

In FIG. 3, the leader pin 10 is provided with a special base at 200 which is threaded at 48 below the tapered surface 24. The lower end of the socket has complementary threads at 50. In this instance, the leader pin must be rotated in the socket to engage threads 48 with threads 50 until anchorage is effected.

In the construction shown in FIG. 4, the leader pin 10 has a tapered extension 20 which, instead of being mounted directly in the die carrying platen 14, is mounted in an extension element 52 having a tapered central boss 54 received into the tapered socket 24 of the platen. A screw 56 in the extension element 52 is threaded into the base 20 of the leader pin as a means of anchoring the leader pin to the extension. The extension, in turn, is connected to platen 14 by screws 58, one of which is illustrated.

In the construction of FIG. 5, the leader pin 101 is entirely cylindrical. It is press fitted into the cylindrical hole of a special mounting bushing 121. Both the leader pin and the bushing are hardened. The bushing 121 has a frusto-conical external surface which fits into the complementary conical surface of the socket 241. At 60 the socket flares outwardly in a downward direction to receive another tapered bushing 62 in which the extreme lower end 64 of bushing 101 is fitted. The screw 281 is threaded into the end portion 64 of leader pin 101 and seats in a washer 66 having a beveled rim complementary to the beveled rim 68 of the conically tapered surface 70 of the bushing 62. When the screw 281 is tightened, it not only draws the leader pin 101 and the bushing 121 pressed therein into the desired upright position, but it firmly seats the bushing 62 in the upwardly tapered portion 60 of the socket in the lower platen 14.

FIG. 6 shows another embodiment in which the leader pin 102 has a pressed fit in a bushing 122 having a mounting portion 202 with a frusto-conical taper to fit the socket 242 of the platen 14. The bushing 122 constitutes an extension of the leader pin 102 and the assembly is anchored by means of a ring nut 70 which is in threaded connection with the lower end 72 of the mounting portion 202 of the extension bushing. The ring nut seats against the shoulder 74 provided by a counterbore 76 at the other side of the platen 14.

The leader pin is reciprocable in the upper bushing 123 in platen 16. The upper bushing is similar to bushing 122 except that the bore is sufficiently large so that instead of being a pressed fit on the leader pin it provides a bearing in which the leader pin is readily reciprocable axially. The anchorage portion 203 of the upper bushing is anchored in tapered socket 243 of the upper platen by means of a ring nut identical with that just described, and similarly mounted.

The preferred method of construction is as follows:

The platen, as for example, platen 14, in which the tapered socket is to be made, is first provided with an annular channel 80 in its upper face 82 and a coaxial annular channel of smaller radius at 84 in its lower face 86. The radii of the respective channels correspond to the larger and smaller dimensions of the conical hole to be punched through the platen.

The platen is now inverted over a die 88 which has an opening at 90 with which the channel 80 registers. The area within the annular channel 84 is now subjected to the pressure of a descending punch 92. FIG. 7 shows the parts as they appear just prior to the descent of the punch. As the punch descends, it will punch from the platen 14 a frusto-conical plug of metal defined by the broken lines shown at 94 and will leave a generally frusto-conical hole through the platen.

FIG. 8 is a view showing diagrammatically how the hole is finished to constitute a frusto-conically tapered socket to receive a leader pin or bushing part as above described. Preferably a roughing tool is used first (not shown). The finishing tool 96 (drill or reamer) has the desired frusto-conical form as shown in FIG. 8. Although the tool has a very short axial travel, it has not yet engaged the work. Thus it will be apparent that in the distance of a small fraction of an inch it will complete the operation of finishing the punched opening 94 to the desired frusto-conical form. Because the required length of travel is so short, the supporting bearing 98 for the tool can be located immediately adjacent the working surface 100.

Because of the short length of travel and the fact that the tool has bearing support closer to the work than is possible with conventional methods, relatively light equipment can be used. The shop equipment for making a die set according to the present invention does not cost over two-thirds as much as the equipment to produce a comparable die set by procedures previously used. Moreover, the tapered socket can be completely finished in readiness for use within a matter of minutes as compared with hours previously required to complete such a socket by the conventional reaming and lapping methods. Thus the total cost of production of the socket is reduced by approximately one-half.

Additional savings of substantial amount are effected in reduced shipping costs and in the elimination of damage in shipment. Presently die sets are shipped completely assembled because the ordinary customer does not have facilities for mounting the leader pins and bushings in the platens in the manner heretofore required. Because the present device is shipped disassembled, the package is materially less bulky, the parts are not subjected to damage in packing, and the high proportion of cases in which damages presently are experienced in shipment is eliminated.

There are also advantages in use. Commercial die sets are frequently very heavy and whether the punch carrier is positioned by hand or by crane, the manipulation of the punch carrier to engage the several leader pins is not only difficult but involves relative lateral movement during which there is frequently an engagement of the punch carrier with one or more of the leader pins in a lateral direction and with considerable momentum, whereby there is heavy stress imposed on the leader pin by reason of the considerable masses involved. As above noted, a leader pin or bushing part mounted according to the present invention will yield slightly in response to such lateral stress and regain its original position automatically and with accuracy. In conventional die sets as heretofore made, such stresses have resulted in permanent damage.

In addition, the present invention permits the leader pin to be rotated at intervals during its use, thereby distributing the wear which commonly occurs almost entirely on the face toward the center of the die set. For both reasons, die sets embodying the invention have greatly increased life as compared with previous die sets.

As indicated in FIG. 1, the tapered holes provided in the upper and lower platens may be identical. This permits the punch carrier to be used as a die shoe or vice versa, since the leader pins and/or bushings are interchangeable between the respective platens. It is also advantageous in assembly and inspection to be able to interchange the leader pin and bushing or to shift them temporarily from one platen to the other.

In case the hole in the platen is cylindrical, an error cannot be corrected except by relocating the hole or welding material into the drilled hole and re-boring. Neither means of repair is practical. However, in the event of an error or deformation of any kind in a die set embodying the present invention, the error can be corrected simply by boring the tapered hole slightly more deeply.

From the standpoint of upkeep and replacement, die sets embodying the present invention have advantages in that even the user, who has no special facilities for precision work can withdraw either the leader pin or the bushing, if desired, to leave the entire surface of either platen exposed for machining or for the drilling or tapping of holes used in mounting the punch or the die. It follows that a damaged leader pin or bushing can be replaced with facility and precision without requiring precision tools.

Because of the ease with which they may be assembled and disassembled, the die sets of the present invention are also much safer to use, since the dies and punches can be mounted with respective platens flat upon a bench and without requiring the use of "parallels." There have been instances in which mis-use of a "parallel" in prior die sets has inflicted serious injury upon the operator.

I claim:

1. A method of making a die set comprising platens and leader pin and bearing bushing parts, said method comprising the steps of making one of said parts with a frusto-conically tapered portion, making a tapered socket in one of said platens, and finishing the socket to be complementary to the tapered portion aforesaid by inserting a tapered cutting tool axially into the tapered socket while centered free of platen contact, providing bearing support for the tool at a point less distant from the platen than the thickness of the platen, and rotating the tool while advancing it axially into platen contact, the advance being for a distance materially less than the thickness of the platen in which the socket is formed.

2. A method of making a die set comprising platens and leader pin and bearing bushing parts, said method comprising the steps of making one of said parts with a frusto-conically tapered portion, making a tapered socket in one of said platens, and finishing the socket to be complementary to the tapered portion aforesaid by inserting a tapered cutting tool axially into the tapered socket while centered free of platen contact, and rotating the tool while advancing it axially into platen contact, the advance being for a distance materially less than the thickness of the platen in which the socket is formed, the making of the socket comprising the preliminary steps of providing coaxial annular grooves of differing radius in opposing faces of the platen, said grooves substantially corresponding with the maximum and minimum radii of opposite end portions of the desired socket, and applying stamping pressure to an area of one face of the platen bounded by the smaller of said grooves in a direction toward the opposite face whereby to displace from the platen a portion thereof which is of progressively increasing radius toward the larger of said grooves, the portion so displaced leaving in said platen the socket adapted to receive said tool.

3. A method of providing a finished frusto-conical hole in a place, such method including the steps of prefabricating the plate to provide a frusto-conical hole of the general form of that desired, inserting centrally into such hole a rotatable cutting tool for finishing the surface of the hole with accuracy, which tool is frusto-conically tapered in accordance with the finished dimensions of the hole desired, centering the tool in the hole independently of contact of the tool with the plate by providing bearing support for the tool immediately adjacent the plate and spaced there from not greatly in excess of the axial movement required to engage the tool with the plate substantially throughout the extent of said socket and thereupon advancing the tool axially for a distance less than the thickness of the platen to engage it substantially concurrently with all portions of the plate bounding the socket while rotating the tool to finish such portions to the desired socket dimension.

References Cited by the Examiner
UNITED STATES PATENTS

| | | | |
|---|---|---|---|
| 37,189 | 12/62 | Westlake | 29—545 |
| 780,728 | 2/05 | Pendergast | 77—72 |
| 1,386,888 | 8/21 | Masters | 77—72 |
| 1,958,829 | 5/34 | Lewin | 29—413 X |
| 2,010,257 | 8/35 | Fehse | 77—72 |
| 2,180,883 | 11/39 | Scott | 29—149.5 |
| 2,405,825 | 8/46 | Grunow | 308—4 |
| 2,419,862 | 4/47 | Wales | 29—163.5 X |
| 2,891,302 | 6/59 | Fuglie | 29—149.5 |
| 2,991,551 | 7/61 | Fogle et al. | 29—548 |
| 3,039,825 | 6/62 | Onulak | 308—4 |
| 3,077,030 | 2/63 | Carlson | 29—407 |

WHITMORE A. WILTZ, *Primary Examiner.*

FRANK SUSKO, THOMAS H. EAGER, *Examiners.*